United States Patent
Fischer

(10) Patent No.: US 12,386,600 B2
(45) Date of Patent: Aug. 12, 2025

(54) COMPILER TRANSFORM OPTIMIZATION FOR NON-LOCAL FUNCTIONS

(71) Applicant: JuliaHub, Inc., Boston, MA (US)

(72) Inventor: Keno Fischer, Cambridge, MA (US)

(73) Assignee: JuliaHub, Inc., Boston, MA (US)

(*) Notice: Subject to any disclaimer, the term of this patent is extended or adjusted under 35 U.S.C. 154(b) by 131 days.

(21) Appl. No.: 18/216,969

(22) Filed: Jun. 30, 2023

(65) Prior Publication Data
US 2023/0342124 A1    Oct. 26, 2023

Related U.S. Application Data

(63) Continuation of application No. PCT/US2022/011245, filed on Jan. 5, 2022.

(60) Provisional application No. 63/133,949, filed on Jan. 5, 2021.

(51) Int. Cl.
G06F 8/41    (2018.01)
G06F 8/51    (2018.01)

(52) U.S. Cl.
CPC .............. G06F 8/443 (2013.01); G06F 8/447 (2013.01); G06F 8/51 (2013.01)

(58) Field of Classification Search
None
See application file for complete search history.

(56) References Cited

U.S. PATENT DOCUMENTS

| | | |
|---|---|---|
| 2008/0263525 A1 | 10/2008 | Berg et al. |
| 2009/0077543 A1 | 3/2009 | Siskind et al. |
| 2018/0113685 A1* | 4/2018 | Gschwind ............... G06F 8/443 |
| 2018/0113689 A1* | 4/2018 | Gschwind ............... G06F 8/443 |
| 2018/0113691 A1* | 4/2018 | Gschwind ............... G06F 8/443 |
| 2018/0113693 A1* | 4/2018 | Gschwind ............... G06F 8/443 |
| 2018/0113694 A1* | 4/2018 | Gschwind ............... G06F 8/443 |
| 2018/0113697 A1* | 4/2018 | Gschwind ................ G06F 8/54 |
| 2018/0329699 A1* | 11/2018 | Gschwind ............. G06F 8/4441 |
| 2019/0096035 A1 | 3/2019 | Li et al. |

FOREIGN PATENT DOCUMENTS

WO    2020214075 A1    10/2020

OTHER PUBLICATIONS

WIPO, International Preliminary Report on Patentability for corresponding PCT Patent Application No. PCT/US22/11245, dated Jul. 4, 2023, 8 pages.

ISA/US; International Search Report and Written Opinion for International Patent Application No. PCT/US22/11245 dated Mar. 30, 2022, 9 pages.

* cited by examiner

*Primary Examiner* — Qing Chen
(74) *Attorney, Agent, or Firm* — NK Patent Law

(57) ABSTRACT

Systems and methods for using compiler transforms to transform a non-local function into a local function are disclosed. The systems and methods perform a dynamic inter-procedural analysis before performing reverse-mode automatic differentiation. The dynamic inter-procedural analysis is performed to determine a maximum set of computer program information. A non-local to local transformation is applied to the determined maximum set of computer program information, and each original instruction is mapped to an optic that is represented as an opaque closure in the transformed local function.

18 Claims, 3 Drawing Sheets

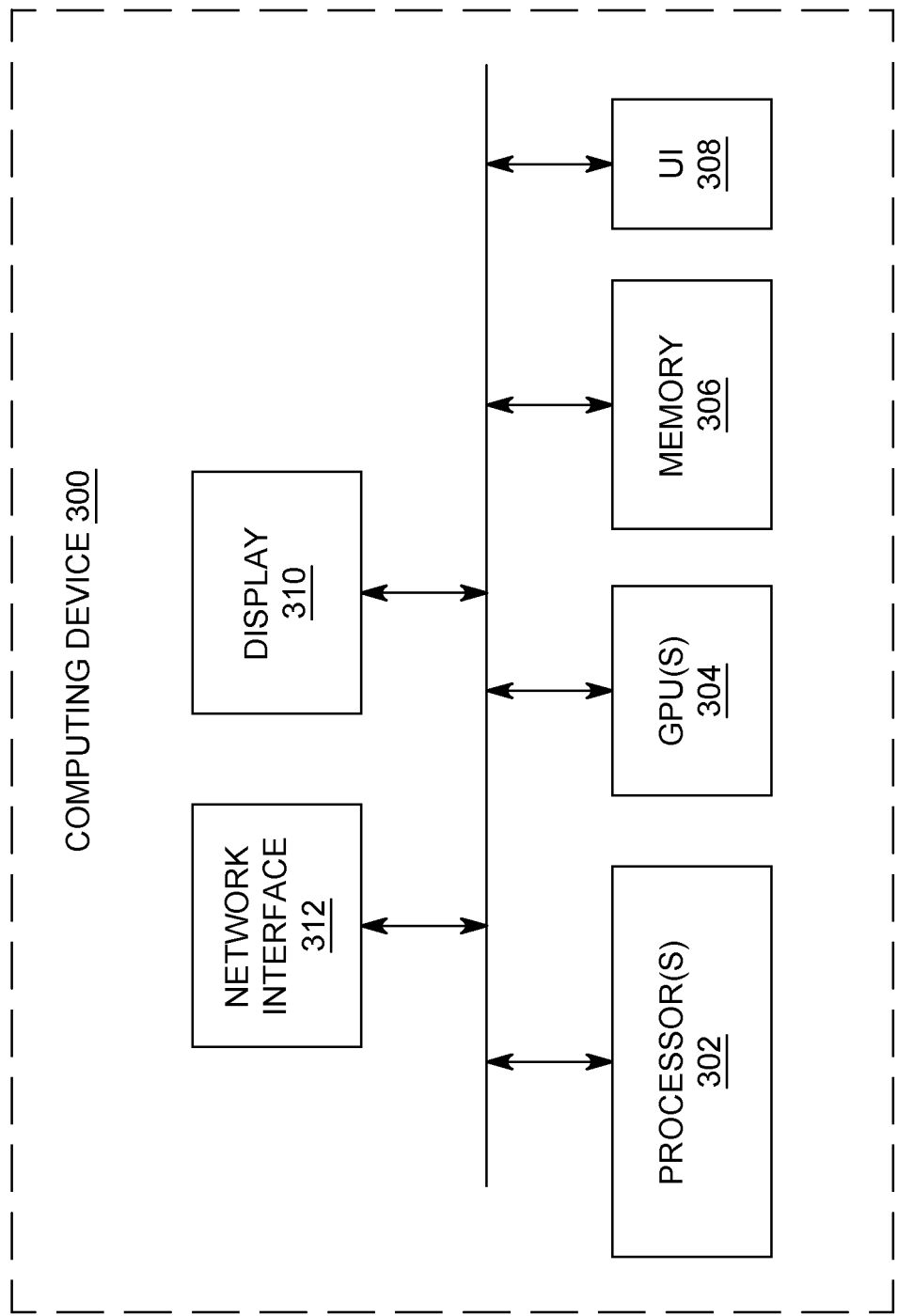

COMPILER TRANSFORM OPTIMIZATION FOR NON-LOCAL FUNCTIONS

CROSS-REFERENCE TO RELATED APPLICATIONS

This application is a continuation application of PCT Application No. PCT/US22/11245 entitled "COMPILER TRANSFORM OPTIMIZATION FOR NON-LOCAL FUNCTIONS," filed on Jan. 5, 2022, which claims priority to U.S. Provisional Patent Application No. 63/133,949 entitled "COMPILER TRANSFORM OPTIMIZATION FOR NON-LOCAL FUNCTIONS," filed on Jan. 5, 2021, the entire contents of all of which are incorporated by reference in their entirety herein.

GOVERNMENT SUPPORT

This invention was made with U.S. Government support under ARPA-E Award No. DE-AR0001222, awarded by ARPA-E. The Government has certain rights in this invention.

TECHNICAL FIELD

The field of the invention relates generally to methods and systems for semantically transforming computer programs in the absence of complete, static information. More specifically, the field of the invention relates to methods and systems for compiler transforms to take higher-order derivatives of a possibly dynamic computer program such that a function that outputs a derivative of a non-local function may be generated.

BACKGROUND

In scientific computing, the concept of automatic differentiation (AD) refers to the process of taking a derivative of a function that is defined by a computer program. The derivative of a function may be used as part of the process of simulating a complex system or for more general optimization tasks. There are several mathematically equivalent methods by which to perform automatic differentiation. In the literature, these are often referred to as "automatic differentiation modes," and commonly classified as forward-mode, reverse-mode, or mixed-mode automatic differentiation.

Forward-mode AD is the simplest to implement in a compiler because it can be optimized locally. This is because the computation of the original function and the derivative happen at the same point in the program execution. However, this is not the case for reverse-mode or mixed-mode schemes of operation, where the derivative is combined by recording information during the computation of the original function and then combining it with additional information at a later point in the execution. This non-local information flow (from the point of recording to the point of computation of the derivative) presents a challenge for optimizing compilers, particularly in dynamic systems where the control flow graph between the two points may not be known. This "non-local problem" results in increased memory usage and unnecessary computation. In many use cases, the increased memory usage and unnecessary computation are significant and prohibitive.

Accordingly, there is a need for methods and systems that efficiently transform non-local transformation problems into local transformations so that traditional compiler optimizations (which assume locality) can be applied to these non-local problems.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The methods and systems described herein provide an improvement to computer functionality in that they solve the above-identified problems by transforming non-local transformation problems into local transformations such that the non-local problems can be solved by a computer. Although the methods and systems for transforming a non-local function into a local function described herein are discussed in the context of taking derivatives of the function, they may also be used on other mathematical functions, such as, for example, Bayesian inference, probabilistic programming, or the like.

The methods and systems described herein apply data-flow analysis in the context of reverse-mode AD in a new and novel way to provide second- and third-order derivatives (or higher order), where prior methods are unable to do so.

One innovative aspect of the methods and systems disclosed herein is that they make possible a hybrid static-dynamic system, which provides the benefit of being able to apply reverse-mode AD (as in a static system) to a dynamic system. This innovative aspect is accomplished by chaining together chunks or blocks of code, which may individually be considered static systems and linking them to corresponding non-local blocks using specifically crafted closures. Thus, the methods and systems described herein provide for an improvement to computer functionality in that they allow for compilers that can apply reverse-mode AD to a dynamic system. They also provide a practical application because such a compiler can be used to generate better, faster, and more accurate models in scientific computing.

A second innovative aspect of the methods and systems disclosed herein is that they provide a novel way to compute second-order and third-order (or higher-order in general) transforms of a function, as explained in more detail below. Traditionally, little additional emphasis has been placed on computing the higher-order transform in a static system because doing so is often considered to be trivially obtainable by repeated application of the first-order transform. Similarly, little emphasis has traditionally been placed on computing the second-order transform in a fully dynamic system because the higher order transforms are often infeasible to compute in such systems. Here, the methods and systems described herein provide the ability to efficiently generate a higher-order differential after an inter-procedural data-flow analysis has been performed. Thus, the methods and systems described herein provide for an improvement to computer functionality in that they make it possible for compilers to generate a higher-order differential where it was previously infeasible. They also provide a practical application because such a compiler can be used to generate better, faster, and more accurate models in scientific computing.

A third innovative aspect of the methods and systems disclosed herein is that they enable the use of inter-procedural analysis as a pre-step for reverse-mode AD in a dynamic system, which is an advance in computing technology, as explained in more detail below.

In these ways, the methods and systems described herein improve the functioning of a computer by teaching methods and systems that can be used to optimize a compiler to generate derivatives that the compiler was previously unable to generate.

BRIEF DESCRIPTION OF THE DRAWINGS

The present embodiments are illustrated by way of example and are not intended to be limited by the figures of the accompanying drawings.

FIG. 3 depicts a block diagram illustrating one embodiment of a computing device that implements the methods and systems for transforming a non-local function into a local function described herein.

DETAILED DESCRIPTION

Figure 1:
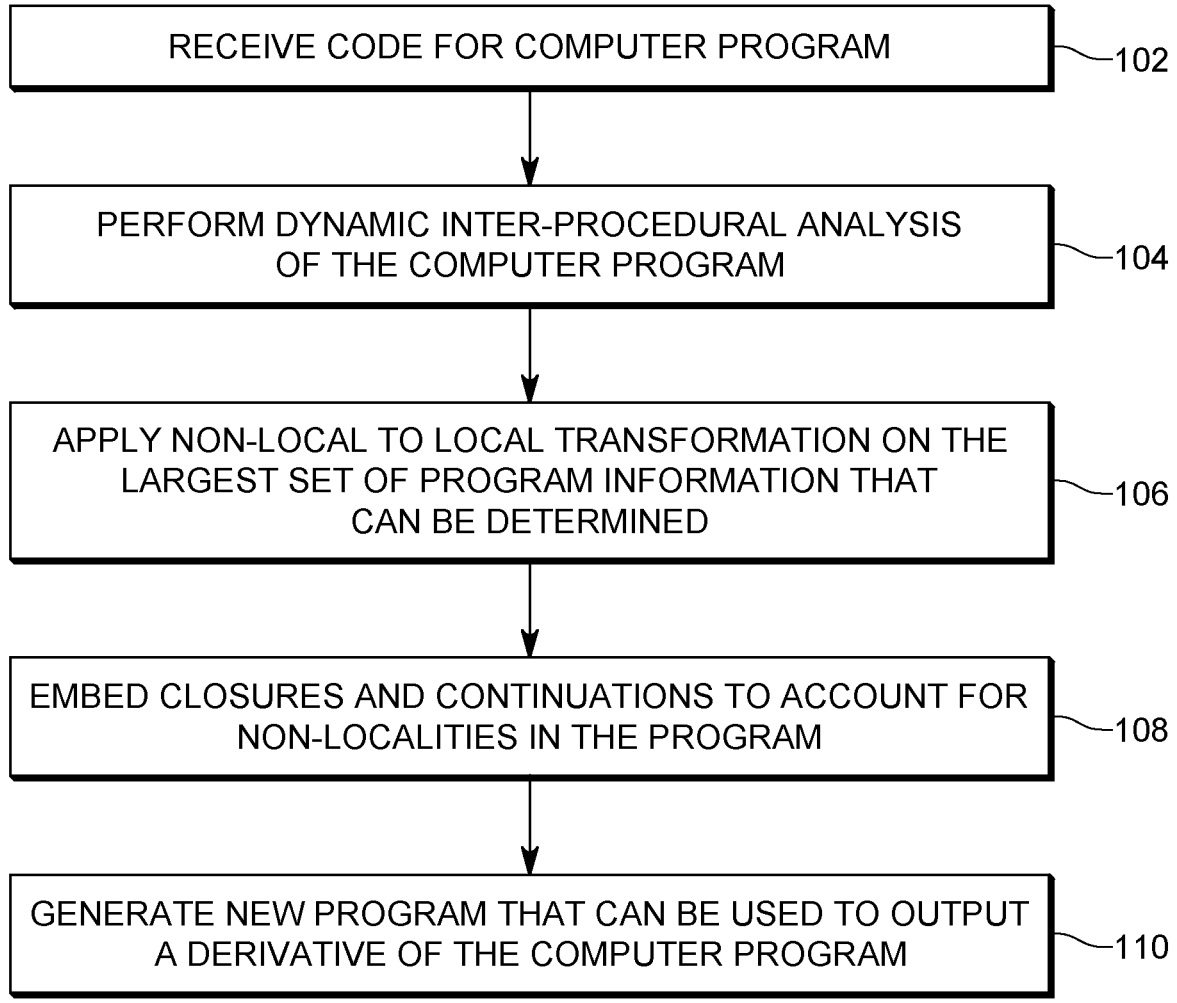
FIG. 1 depicts an exemplary process flow for performing a compiler transform of a computer program from a non-local function to a local function.

The following description and figures are illustrative and are not to be construed as limiting. Numerous specific details are described to provide a person having ordinary skill in the art with an understanding of the disclosure. A person having ordinary skill in the art for this disclosure is considered to be a person having experience designing and implementing AD systems, including reverse-mode AD systems.

The methods and systems described herein transform non-local transformation problems into local transformations such that the non-local problems can be solved by a computer. They encode a transform that generates higher-order derivatives as something other than repeated application of first-order derivatives.

Reverse-mode AD is a known method of taking a derivative of a function in a static system. In static systems, reverse-mode AD works because all the information about the system is available (i.e., because the system is static). Static systems can be optimized using reverse-mode AD.

This reverse-mode AD approach to optimizing the system cannot be efficiently applied to dynamic systems, such as, for example, machine-learning systems. This is because reverse-mode AD is generally handled on a block-by-block basis; however, because information about a dynamic system is unknown at the time the reverse-mode AD is applied to the system, optimizations cannot be successfully used in the context of dynamic systems. For this reason, reverse-mode AD has not traditionally been successful when used on dynamic systems for applications where AD performance is a concern (particularly higher-order derivatives or scalar code). One of the key decisions when implementing an AD system, for example, in a compiler, is how to integrate the AD system into the underlying programming language. The details for implementing an AD system are specific to the particular programming language being used, but there are a number of common themes and design choices that apply across various programming languages, as explained in more detail below. The goal is to arrive at an implementation that performs AD using existing facilities in the programming language or only requires minimal extensions to the existing semantics of the programming language. It is preferable to keep the number of distinct concepts in a programming language as small as possible to avoid an exponential number of interactions between the different concepts that all need to be addressed.

A common entry point for implementing an AD system is to leverage the underlying programming language's support for polymorphism. In forward-mode AD systems, creating a new datatype that simply overloads the "+" operator and the "*" operator may be sufficient to obtain a basic AD system; however, such a basic AD system may require additional modifications to handle perturbation confusion and production performance concerns. However, the same idea cannot be straightforwardly applied to reverse-mode AD systems. This is because reverse-mode AD requires non-local information flow from the primal to the dual. Consider, for example, a sequence of three operations: A→B→C. In forward-mode AD, the differentiated program will have the structure A→A'→B→B'→C→C', and the information flow from X to X' can be handled locally. For reverse-mode AD, on the other hand, the structure of the transformed program would look like A→B→C→C'→B'→A'. Thus, the information flow from A to A' is no longer local, and this "residual" information needs to be stored somewhere while the rest of the program (i.e., B through B') is running. Determining which programming-language construct is most suitable to store this residual information is a design choice to be made by a person having ordinary skill in the art when implementing a reverse-mode (or mixed-mode) AD system according to the methods and systems described herein.

A common choice seen in early AD systems (and again in the first generation of Machine Learning systems) was to record both the operation that was performed and the corresponding residual information in a dynamic stack data structure, referred to in the literature as a "tape." Tape-based AD systems are the simplest possible example of a "tracing" AD system. The key distinguishing factor of tracing AD systems is that they perform a single nonstandard evaluation of the function of interest and build a dynamic data structure that represents a linearized version of this program.

Simple AD systems may then simply walk this representation backwards to compute the reverse-mode AD results, while more sophisticated systems may generate code based on the tape and perform optimizations. Tracing-based AD systems are popular because they can be implemented with minimal support from the underlying programming language and have similar feature requirements on the underlying programming language as do polymorphism-based forward-mode AD systems. However, tracing-based AD systems also suffer from a number of significant drawbacks. For one, the trace generally represents a single concrete execution of a program. If the set of operations (an operation here meaning whatever level of granularity is supported by the AD rule system) is variable, this dependence is generally not captured in the trace, and any change in the set of operations will require generation of a new trace. Some systems have developed techniques to limit the impact of this for particular applications, for example, by creating new primitives to hide variability from the AD system, but it remains one of the most fundamental limitations of tracing-based AD systems. Another issue is that by lifting the trace outside of the host language, the most advanced tracing-based AD tools are generally creating their own "meta-language" that require their own tooling, optimizers, profiler, debuggers, etc., which is a significant and costly implementation effort that would be better spent on improving the host language itself.

The most sophisticated AD implementations eschew the tracing approach and instead seek deep integration into the host language to sidestep the need for trace re-generation and to be able to leverage the host language optimizer for optimization of both the transformed program itself and the boundary between the transformed program and the host program. Such language-integrated AD systems are generally required for code exhibiting high control flow irregularity or fine-grained scalar operations where the overhead of a tracing system is not acceptable.

Designing a language-integrated AD system is more difficult because it requires deep integration with and support from the underlying host language. The problem becomes slightly easier if the host language in question is static and all control flow edges can be assumed to be statically visible at compile time. Such a language can be extended with a "derivative" operator that computes derivatives, but whose implementation does not need to itself be legal in the language and can be performed entirely by the compiler.

Consider the scenario of a language-integrated AD system for a dynamic language. One difficulty for such an implementation is that the program to be executed is generally not known ahead of time (or even while AD is being performed) and as such, there must be some first class value within the semantics of language that represents any residual information required by later evaluation. As such, there are generally two fundamental choices to be made for a language-integrated AD system in a dynamic language that must be provided by the host language: (1) the mechanism by which primal functions are lifted to AD-transformed functions; and (2) the data structure used to hold residual information. How these two choices are made and how well they are supported in the host language has a significant impact on the ultimate performance and capabilities of the AD system.

There are several prior examples known in the literature. For example, a reverse-mode AD system on an abstract lambda calculus has been described. In this lambda calculus, the closures are first class objects containing their implementation and may thus be transformed by a higher-order function (e.g., Point (1) from above) and lambda calculus closures are used as the residual data structure (e.g., Point (2) from above). As this description considers an abstract lambda calculus, no particular consideration is made as to implementation performance. More real-world implementations exist. For example, the system described by Innes et al., "A Differentiable Programming System to Bridge Machine Learning and Scientific Computing," makes use of Julia computing language's generated function mechanism for transformation support (e.g., Point (1) from above) and again uses Julia computing language's closures (note that despite the name, they are somewhat semantically distinct from pure lambda calculus closures) to hold residual information (e.g., Point (2) from above). As another example, Wang et al., "Demystifying Differentiable Programming: Shift/Reset the Penultimate Backpropagator," describes a system where transformation is performed using Scala's Lightweight Modular Staging system (e.g., Point (1) from above) and residual information is captured in shift/reset delimited continuations (e.g., Point (2) from above).

Generally, all of the above mentioned systems handle higher-order AD by applying the first-order transform multiple times. In practical applications, these systems demonstrate a number of challenges, particularly at higher orders. In particular, because these systems have generally separate transformations and optimizations stages, they can generate large amounts of code that an optimizer would then have to reduce back (either causing significant performance problems or requiring unreasonably high compile times). Another challenge is that their representations of the residual information is only minimally optimizable by the language optimizer.

The methods and systems described herein describe an AD system that makes three fundamental changes to address these issues, as explained in more detail below.

The first change implemented in the methods and systems described herein to address these issues is to choose a residual data structure (e.g., opaque closures in the Julia computing language) with restricted semantics that allow the optimizer to optimize the data layout of the residual—even in the absence of static control flow information—and in particular to scale the optimization opportunity in proportion to the availability of static information (scaling from completely dynamic to matching what would have been possible with a static-language transform).

The second change implemented in the methods and systems described herein to address these issues is to move from a single transformation stage to an interleaving of transformation and optimization. This requires additional support from the host language, but it can provide significant performance improvements. Semantically, the transformation looks no different from before (and indeed gives identical results in the absence of any additional static information). However, in the implementation, the AD transformation is delayed until some early optimizations have been performed and immediately generate code for the $n^{th}$-order transformation (rather than repeating n first-order passes), followed again by an optimization pass.

The third change implemented in the methods and systems described herein to address these issues is to move away from treating higher-order AD as repeated first-order AD. Repeated first-order AD generates data flow patterns that are difficult for the optimizer to optimize. Instead, by taking advantage of the theory of optics, a data structure for the $n^{th}$-order residual is directly created that keeps the data flow apparent to the host language optimizer and is thus amenable to a more performant implementation.

Through the combination of these three changes, the performance and generality of the AD system has been significantly improved by the methods and systems described herein.

When compiling code for a computer program, the locality of dataflow affects the performance of the resulting code. In general, compilers seek to propagate information from some information creation site, to some information usage site. To do so, a compiler must ensure that the information is not modified or invalidated between its creation and usage point. Suboptimal arrangement of code can prevent the compiler from ascertaining that the information remains valid at the usage site, significantly pessimizing the set of possible optimizations.

A function may be represented as a computer program, or, conversely, a computer program may represent one or more functions. It is often desirable to take a derivative of the function or functions represented by the computer program. This may be thought of as taking a derivative of the computer program itself. The derivative of a computer program is itself a computer program.

Computing derivatives of a computer program may be performed by the compiler, which generates the executable code for the computer program. However, because derivatives are non-local transformations, it can be difficult to generate a derivative function of a computer program. Additionally, because many computer programs are written in dynamic programming languages, in which behavior of the program may be modified during execution, the functional operation of those computer programs may not be fully known at compile-time. For these reasons, performing automatic differentiation on a computer program written in a dynamic programming language is a complex process. Because of the complexity of compiling a computer program written in a dynamic programming language, the generation of (particularly higher-order) derivatives of the computer program is often too resource-intensive and/or too slow to be successfully performed. The non-local function transformation system described herein makes it possible to generate the higher-order derivatives much more quickly than has traditionally been possible.

The methods and systems described herein may be used in a compiler, and the transformation allows the compiler to use compiler optimizations on the code being compiled. The methods and systems described herein provide an implementation that is a compiler transform of a computer program, which may be thought of as a function. A primal program is taken as input, and an output of another program that computes the desired order derivative is generated.

Optic constructions are used as part of a compiler transform to transform a non-local function, for which a derivative may not easily be taken at compile-time, into a local function, for which a derivative can be taken at compile-time.

This is advantageous in situations where the desired mode of AD exhibits the non-local problem and the complete control flow graph is not known at compile time. The compiler transform to a derivative allows the problem to be treated as a local problem. This is accomplished using an opaque closure and treating the non-local part of the problem as if it is local.

An optic construction provides the ability to combine both a covariant and a contravariant transformation in one abstraction while retaining composability. Optics have a composition property that allows for two optics to be combined into another optic. The compiler transform operates by mapping each instruction in the primal program to a corresponding optic. Because the composition rules of the primal program and the optic are compatible (a property known as "functoriality"), this is a well-defined operation. Optics can be implemented in a programming language through a variety of primitives, among them opaque closures or other forms of delayed continuation primitives. By representing the resulting optic as one of these primitives, a local representation of the non-local problem is obtained.

A computer program that is subject to a non-local problem may be localized if the totality of the computer program can be analyzed. In such a scenario, and given sufficient computing resources, the entire range of outputs may be generated for that computer program, which allows for a derivative to be efficiently taken for the computer program with equal efficiency as a fully-static system.

The methods and systems described herein localize a non-local problem, even if the whole program information is unknown or uncertain. This is particularly relevant in the case of dynamic programming languages, for example, where full program information is not available. In static programming languages it can be, for example, difficult to express certain machine-learning algorithms. Thus, in the context of machine learning, the full program state will often be unknown.

In the context of a computer program, there is a tension between the expressibility and/or the flexibility of the computer program, on the one hand, and the ability to have full program information of the computer program, on the other hand. If the full program information is known for the program, then the program will necessarily be restricted in what the program can express, because everything about program must be known a priori.

Conceptually, taking a derivative of a program is thought of as an operation that can occur only when the full program information is known. However, it is desirable to be able to take a derivative in the case where the full program information is not known.

The methods and systems described herein use compositionality to take a derivative in a case where the full program information is not known. Traditionally, compilers perform local transformations on individual pieces of a computer program at a relatively local scale (e.g., one function, one block of code, one instruction, etc.) and then assemble those local transformations into the larger transformation. The same is true for taking derivatives, in which derivatives are performed at a local level and then combined.

One aspect of the methods and systems described herein is that they convert a non-local problem into a local problem using specially crafted closures or other continuation primitives. Closures and continuations are embedded pieces of computer code that can be created at one point in the execution and called at a separate, later point of the execution to perform a specified function. The closures and continuations that are used are crafted to represent optics constructions, thus inheriting their compositional properties, as will be explained in more detail below.

FIG. 1 depicts an exemplary process flow for performing a compiler transform. The compiler transform of FIG. 1 may be used to transform a computer program from a non-local function to a local function.

Referring to FIG. 1, the method begins with receiving code for the computer program, at step 102. The code includes a plurality of original instructions, such as other functions. The code may be written in any programming language. In one embodiment, the code is written in the Julia computing language. The code may be received as input by a user via a graphical or textual user interface through which the user defines the math of the function to be transformed. The code may be manually input by the user, or it may be imported from an existing source-code file.

At step 104, the method performs a dynamic inter-procedural analysis of the computer program. The dynamic inter-procedural analysis is used to determine a maximum set of computer program information that can be determined for the computer program at the present point of the execution. The inter-procedural analysis may be performed using any standard data-flow algorithm as is known in the art. The quality and/or completeness of the computed information determined from the inter-procedural analysis will have a significant impact on the quality of the resulting compiler transformation. A high-quality implementation, as well as a tuned programming language, may be required to achieve acceptable performance, as previously explained. In one embodiment, the inter-procedural analysis may be performed using the Julia programming language, as described in Bezanson et al., "Julia: Dynamism and Performance Reconciled by Design," available at http://janvitek.org/pubs/oopsla18b.pdf, the entire contents of which is incorporated herein by reference.

The computer program may be evaluated on an abstract symbolic domain, and a maximum set is determined. At some point during the process of determining the maximum set, the program will run out of available information. This may occur, for example, because the program becomes too complex or because the program requires user input to continue. As will be understood by people skilled in the art, it is possible to look at a segment of computer source code (e.g., a function or a program) and ascertain particular details about how that code operates. For example, as will be understood, it may be possible to know from looking at function $f(\ )$ that it will call functions $g(\ )$ and $h(\ )$. However, it may not be possible to know what functions $g(\ )$ and $h(\ )$ will do, for example, because those functions may take as input a variable that is currently unknown.

At step 106, the method applies a non-local to local transformation on the determined maximum set of computer program information that was determined through the dynamic inter-procedural analysis. This will be the largest set of program information that can be determined. For programs exhibiting the non-local problem, this set of program information will often not be large enough to encompass the invocation of the delayed portion of the execution. As a result, traditional compiler optimizations are unable to fully optimize programs exhibiting the non-local problem. The method described herein allows the application of such optimizations.

In one embodiment, the non-local to local transformation includes interleaving a transformation step and an optimization step. The transformation may be delayed until at least one optimization step has been performed. After at least one optimization step has been performed, the transformed computer program may be generated for an $n^{th}$-order transformation. In one embodiment, the non-local to local transformation includes creating a data structure for an $n^{th}$-order residual such that the transformation can be optimized.

At step 108, the method embeds opaque closures (or some other continuation primitive) into the transformed code to account for non-localities in the computer program. In one embodiment, this is accomplished by mapping each of one or more of the plurality of original instructions to an optic. In one embodiment, this mapping may include treating a primal function as an optic. In other words, the optic may not necessarily be explicitly represented. For example, in practice, it may be easier to modify the data-flow algorithm to treat the primal function as if it were an optic, so the mapping step may not actually be explicit. The optic is represented as an opaque closure in the transformed local function. Closures are a programming language primitive that delay execution of an embedded piece of code until a specified later execution point. Opaque closures impose an additional constraint that the language runtime shield the closure from most modifications to the global language environment. Whether closures are opaque or not depends on the implementation choices of the language, but in dynamic languages the default implementation of closures is often non-opaque. For maximum efficiency of the methods and systems described herein, opaque closures are preferred, as non-opaque closures must account for the fact that modifications to the global environment may later modify the semantics of the embedded code.

At step 110, the method generates a transformed computer program that represents the transformed local function. The transformed computer program can be used to output a derivative of the computer program. This transformed computer program itself is not the derivative, but rather a program that, when provided with the proper inputs, will output the derivative of the computer program for which the derivative is being taken.

Thus, the method provides the novel combination of performing dynamic exploration (e.g., the inter-procedural analysis) to get as much program information as possible and performing the transformation on the largest piece found by the dynamic exploration, and then making the non-local transformation local. The dynamic or ahead-of-time exploration determines how much dynamic information can be determined for the program.

To perform the dynamic inter-procedural analysis in step 104, the method lifts the received program, as well as any initial program information (such as the types or shapes of the input) to a symbolic domain and attempts to propagate as much information as possible over the lattice of possible information. For example, rather than compute that the function 1+2 evaluates to 3, in the symbolic domain, it would be computed that for any two integers a and b, the function a+b will be an integer. The choice of information flow lattice is generally determined by the underlying programming language, but may be augmented by the detailed compiler transformation for additional efficiency.

Thus, the propagation of the computer program is explored from the entry point of the program to the maximum extent possible. Once the maximum extent is reached, the transform is performed on the available information. The more information that is available, the more efficient the program will be. When the generated program is executed, the execution may dynamically reach a point where information was statically unavailable during the original analysis. At any such point, the original process is repeated (i.e., the method returns to step 104), taking the newly obtained dynamic information as inputs to the inter-procedural analysis. Because the inter-procedural analysis is not concerned with the actual value of any expression in the original code, but rather only the projection of said value onto the information lattice, the inter-procedural analysis may be performed significantly faster than evaluating the function on concrete values (and may additionally be re-used between executions, if the information-lattice projection is compatible).

By way of example of the method described in the context of FIG. 1, consider a simple example of the function $f(\ )$ Assume that $f(\ )$ is simply the composition of two other functions, $g(\ )$ and $h(\ )$ This example is shown written using pseudo-Julia syntax; however, a person having ordinary skill in the art will recognize that the principles described here can be applied to any programming language.

The function $f(\ )$ is shown in the exemplary code shown in Table 1.

TABLE 1

| Line | Code |
|---|---|
| 1 | function f(x) |
| 2 | y = g(x) |
| 3 | z = h(y) |
| 4 | return z |
| 5 | end |

The differential optic functor is applied to obtain the corresponding optic, as shown in the exemplary code shown in Table 2. This optic is not by itself a program, but it can be represented in programmatic syntax.

TABLE 2

| Line | Code |
|---|---|
| 1 | optic $\partial^{\leftarrow -1}$ f(x) |
| 2 | y = $\partial^{\leftarrow -1}$ g(x) |
| 3 | z = $\partial^{\leftarrow -1}$ h(y) |
| 4 | return z |
| 5 | end |

As can be seen from the exemplary code of Table 2, each constituent function of the function $f(\ )$ is lifted to the optic domain. The validity of this transformation is guaranteed by the semantics of the optical construction and the functoriality of the lifting process.

As mentioned, the optic itself is not an executable program. To obtain an executable program, a representation of the optic in the underlying programming language is selected. Various representations may be selected in this scenario and are a matter of design choice by a person having ordinary skill in the art, as previously explained above. In one embodiment, opaque closures are used. Opaque closures are advantageous for post-transformation optimizations. Representing the optic using an opaque closure is shown in the exemplary code shown in Table 3.

TABLE 3

| Line | Code |
|---|---|
| 1 | function $\partial^{\leftarrow 1}$ f(x) |
| 2 | y, $\overline{y}$ = $\partial^{\leftarrow 1}$g(x) |
| 3 | z, $\overline{z}$ = $\partial^{\leftarrow 1}$h(y) |
| 4 | return z, @opaque Δ→ begin |
| 5 | y' = $\overline{z}$(Δ) |
| 6 | x' = $\overline{y}$(y') |
| 7 | return (x') |
| 8 | end |
| 9 | end |

In this example, we assume, for simplicity of notation, that the pseudo notation functions themselves are always singleton (and thus have trivial derivative, which is omitted in the notation). This is not required.

Except for this choice of opaque closures shown in the code of Table 3, the code of Table 3 recovers the form returned by the most advanced existing tools, such as Zygote. However, there are significant differences in the generated code and the performance of the methods and systems described herein at higher orders.

Although the optic representative itself does not compute the derivative, it may produce the derivative when appropriately invoked. For example, to compute the first derivative of $-\sin(x)$, the code shown in the exemplary code shown in Table 4 may be used.

TABLE 4

| Line | Code |
|---|---|
| 1 | function first_der_neg_sin(x) |
| 2 | return $(\partial^{\leftarrow 1}(-\sin)(x))[2](1.0)$ |
| 3 | end |

Applying an inter-procedural analysis to this function shown in the code of Table 4, it can be seen that the primal result is unused, and that only the dual function needs to be generated, as shown in the exemplary code of Table 5.

TABLE 5

| Line | Code |
|---|---|
| 1 | function first_der_neg_sin(x) |
| 2 | return (−cos(x)) |
| 3 | end |

In general, the same result may be achieved by exchanging the order of the transformation and the inter-procedural analysis, followed by a standard compiler optimization pass.

For example, −sin may be plugged into the function $f(\ )$, as shown in the exemplary code of Table 6.

TABLE 6

| Line | Code |
|---|---|
| 1 | function $\partial^{\leftarrow 1}$ (−sin)(x) |
| 2 | y, $\overline{y}$ = $\partial^{\leftarrow 1}$sin(x) |
| 3 | z, $\overline{z}$ = $\partial^{\leftarrow 1}$(−(y)) |
| 4 | return z, @opaque Δ→ begin |
| 5 | y' = $\overline{z}$(Δ) |
| 6 | x' = $\overline{y}$(y') |
| 7 | return (x') |
| 8 | end |
| 9 | end |

After the inter-procedural analysis and in-lining are performed on the code in Table 6, the function is as shown in the exemplary code shown in Table 7.

TABLE 7

| Line | Code |
|---|---|
| 1 | function $\partial^{\leftarrow 1}$ (−sin)(x) |
| 2 | y, $\overline{y}$ = sin(x), Δ→ Δ * cos (x) |
| 3 | z, $\overline{z}$ = (−(y), Δ→ −Δ |
| 4 | return z, @opaque Δ→ begin |
| 5 | y' = $\overline{z}$(Δ) |
| 6 | x' = $\overline{y}$(y') |
| 7 | return (x') |
| 8 | end |
| 9 | end |

Because an opaque closure is being used as a representative, the capture list can be re-written and in-lining can be performed again, as shown in the exemplary code of Table 8. This is allowed because of the opaqueness of the closure. Other types of closures would have required retention of the original capture list.

TABLE 8

| Line | Code |
|---|---|
| 1 | function $\partial^{\leftarrow 1}$ (−sin)(x) |
| 2 | y = sin(x) |
| 3 | z = −y |
| 4 | return z, @opaque Δ→ begin |
| 5 | y' = Δ * cos(x) |
| 6 | x' = −y' |
| 7 | return x' |
| 8 | end |
| 9 | end |

The code of Table 8 may be further in-lined into the first_der_neg_sin function shown above in Table 4, which gives the exemplary code shown in Table 9.

TABLE 9

| Line | Code |
|---|---|
| 1 | function first_der_neg_sin(x) |
| 2 | y = sin(x) |
| 3 | z = −y |
| 4 | y' = 1.0*cos(x) |
| 5 | x' = −y' |
| 6 | return x' |
| 7 | end |

Further simplification of the code in Table 9 recovers the minimal form of the first derivative of −sin(x). In this particular example, the order of operations is thus irrelevant since the example is fairly simple. However, in large examples, performing the inter-procedural analysis after the transformation tends to generate infeasibly large optimization problems for the compiler. In this particular example, non-opaque closures could be used, since this particular example is simple enough that the entire call chain can be seen. However, unlike regular closures, the optimizations that were made to $\partial^{-1}(-\sin)$ in the code of Table 8 applied before it was in-lined into the called function (as shown in the code of Table 9), which is not possible with regular closures.

Turning to the application of this method to higher-order derivatives, the process begins the same way as described above, except that in the case of higher-order derivatives, the function is mapped to a higher-order optic. Here, the higher-order optic may be referred to as a $2^{nd}$-order optic, although (1,1)-optic may be more appropriate given the underlying mathematics. This results in code shown in the exemplary code of Table 10.

TABLE 10

| Line | Code |
| --- | --- |
| 1 | optic $\partial^{-2}$ f(x) |
| 2 | y = $\partial^{-2}$g(x) |
| 3 | z = $\partial^{-2}$h(y) |
| 4 | return z |
| 5 | end |

The representative for second-order optics is significantly larger, consisting of four separate functions (i.e., the primal function plus three nested opaque closures), as shown in the exemplary code of Table 11.

TABLE 11

| Line | Code |
| --- | --- |
| 1 | function $\partial^{-2}$ f(x) |
| 2 | y, $\bar{y}$ = $\partial^{-2}$g(x) |
| 3 | z, $\bar{z}$ = $\partial^{-2}$h(y) |
| 4 | return z, @opaque $\Delta \rightarrow$ begin |
| 5 | $\alpha, \bar{\alpha} = \bar{z}(\Delta)$ |
| 6 | $\beta, \beta^- = \bar{y}(\Delta)$ |
| 7 | $\beta$, @opaque $\Delta^2 \rightarrow$ begin |
| 8 | $\gamma, \gamma^- = \beta^-(\Delta^2)$ |
| 9 | $\delta, \delta^- = \bar{\alpha}(\gamma^-)$ |
| 10 | $\delta$, @opaque $\Delta^3 \rightarrow$ begin |
| 11 | $\epsilon = \delta^-(\delta^-)$ |
| 12 | $\zeta = \gamma^-(\epsilon)$ |
| 13 | end |
| 14 | end |
| 15 | end |
| 16 | end |

In the code of Table 11, each nested function is structurally reversed from its immediate parent. This is a subtle point in this simple example; however, it is apparent in the presence of control flow.

The representation is significantly larger than at first order. In general, an n-th order representation will require $2^n$ functions. It is for this reason that performing as much analysis as possible before the transformation is beneficial, because any analysis afterward will be more expensive by at least a factor of $2^n$.

This is not the same form that would have been produced by application of the first-order transform to the representation (seen in the code of Table 6) obtained by first-order transform of the original function, which would have been as shown in the exemplary code of Table 12.

TABLE 12

| Line | Code |
| --- | --- |
| 1 | function $\partial^{-1}\partial^{-1}$ f(x) |
| 2 | (y, y$^1$), y$^2$ = $\partial^{-1}\partial^{-1}$g(x) |
| 3 | (z, z$^1$), z$^2$ = $\partial^{-1}\partial^{-1}$h(y) |
| 4 | return (z, @opaque $\Delta \rightarrow$ begin |
| 5 | ($\bar{z}$, y'), y'$^1$ = z$^1$($\Delta$) |
| 6 | ($\bar{y}$ x'), x'$^1$ = y$^2$($\Delta$) |
| 7 | (($\bar{y}$, $\bar{z}$), x'), @opaque $\Delta^2 \rightarrow$ |
| 8 | y'' = x'$^1$($\Delta^2$) |
| 9 | z'' = y'$^1$(y'') |
| 10 | return z'' |
| 11 | end |
| 12 | end), @opaque (($\bar{y}$, $\bar{z}$), $\Delta^3$) $\rightarrow$ begin |
| 14 | yy = z$^2$($\Delta^3$) + $\bar{z}$ |
|  | xx = y$^2$(yy) + $\bar{y}$ |
|  | return xx |
| 15 | end |
| 16 | end |

In the code of Table 12, the value $(y, z)$ is not contained in the capture list of the third closure but is instead passed out and expected to be passed back in later. Because of this non-locality, the compiler must be conservative and may not assume that the value is unmodified in the meantime. As a result, the ability to optimize the values contained in $(y, z)$ is lost. The issue is not present in the $\partial^{-2}f$ case, because the same values are captured by the opaque closure, and thus optimization is permitted. Additionally, $\partial^{-2}f$ can be generated from the original function, without generating any intermediate forms, while the same is not possible for $\partial^{-1}\partial^{-1}f$. As a result of both of these factors, working with the $\partial^{-2}f$ form is easier and more efficient than working with the $\partial^{-1}\partial^{-1}f$ form employed by earlier systems.

It may sometimes be necessary to translate between the $\partial^{-1}\partial^{-1}$ form and the $\partial^{-2}$ form of a function. For example, primitive rules of the system are generally manually written out by the user in $\partial^{-1}$-like form. To create the $\partial^{-2}$ form, the transform is applied to the explicit $\partial^{-1}$ form, obtaining the moral equivalent of the $\partial^{-1}\partial^{-1}$. To interface this with the rest of the system (which makes use of the $\partial^{-2}$ form), the explicitly written-out form of the isomorphism between these forms may be used, as shown in the exemplary code of Table 13.

TABLE 13

| Line | Code |
| --- | --- |
| 1 | function $\partial^2$a(x) |
| 2 | (y, $\bar{y}$), $\bar{y}$ = $\partial$rrule(a, x) |
| 3 | y, $\Delta \rightarrow$ begin |
| 4 | $\alpha, \bar{\alpha} = \partial$typeof $(\bar{y})(\bar{y}, \Delta)$ |
| 5 | $\alpha, \Delta' \rightarrow$ begin |
| 6 | ($\Delta''', \beta$) = $\bar{\alpha}(\Delta')$ |
| 7 | $\beta, \Delta'' \rightarrow$ begin |
| 8 | # Drop gradient w.r.t. 'rrule' |
| 9 | (_, a', x') = $\bar{y}(\Delta'', \Delta''')$ |
| 10 | return(a', x') |
| 11 | end |
| 12 | end |
| 13 | end |
| 14 | end |

The opposite situation also arises. If the user requests the $\partial^{-1}$ form of a function that itself contains uses of $\partial^{-}$ (e.g., the user wishes to perform sensitivity analysis of a differential equation), then the form $\partial^{-n}$ must be translated back to $\partial^{-}\partial^{-n-1}$ form.

In general, however, these transformations are only needed at the fringe of the control flow graph. Most processing may be performed using the more efficient higher-order forms.

The methods described herein, including the method described in the context of FIG. 1 and the method described in the exemplary code shown in Tables 1-13, may be performed by a computer system comprising one or more processors for executing the methods described herein. The computer system may further comprise memory. The computer system may further comprise a compiler. The computer system may further comprise a graphical user interface for allowing users to interact with the compiler, for example, to receive user input such as a computer program to be analyzed.

Figure 2:
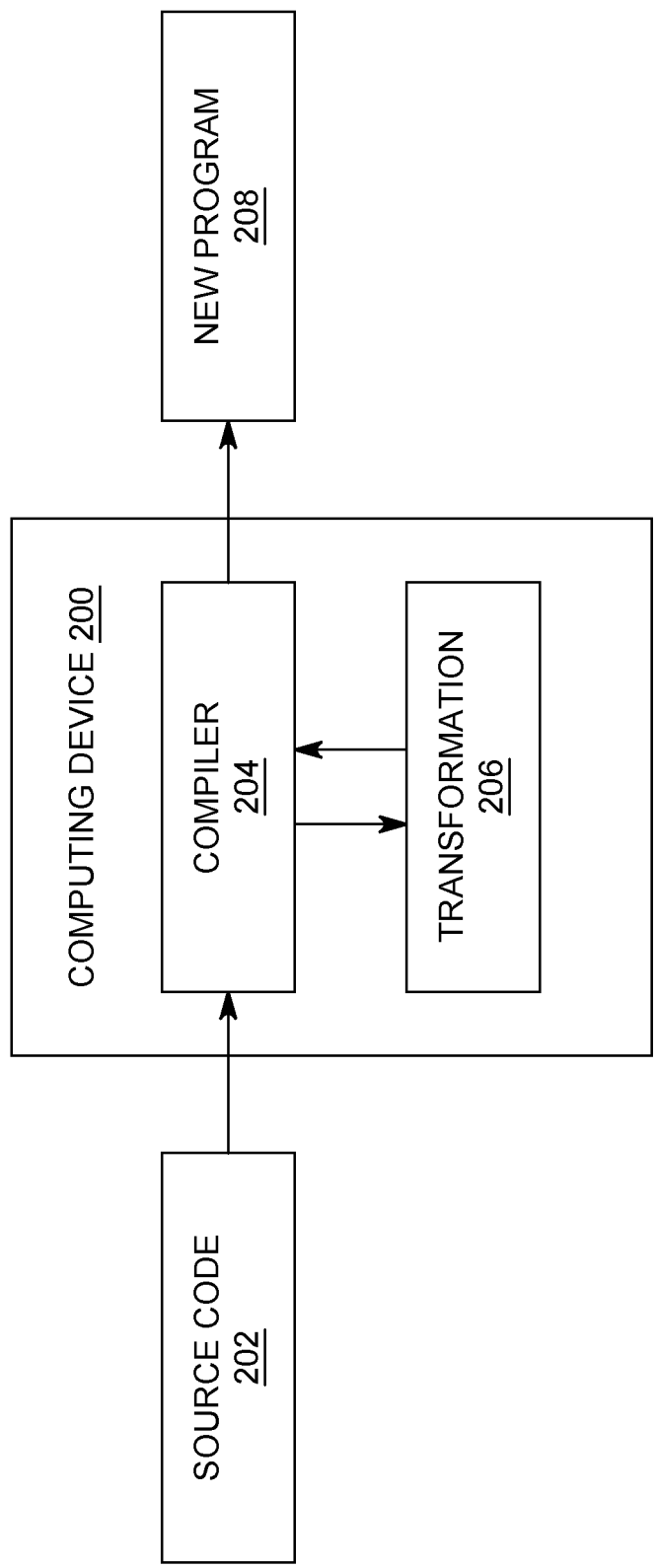
FIG. 2 depicts an exemplary block diagram for performing a compiler transform of a computer program from a non-local function to a local function.

FIG. 2 depicts an exemplary block diagram for performing a compiler transform of a computer program from a non-local function to a local function. Referring to FIG. 2, computing device 200 may include a compiler 204. The compiler 204 receives source code 202 as an input and applies a transformation 206 to the source code 202. The transformation 206 is applied as described in the context of FIG. 1 and the exemplary code shown in Tables 1-13. The computer 204 outputs a new program 208, which has been generated as part of the transformation 206.

FIG. 3 depicts a block diagram illustrating one embodiment of a computing device that implements the methods and systems for transforming a non-local function into a local function described herein. Referring to FIG. 3, the computing device 300 may include at least one processor 302, at least one graphical processing unit ("GPU") 304, a memory 306, a user interface ("UI") 308, a display 310, and a network interface 312. The memory 306 may be partially integrated with the processor(s) 302 and/or the GPU(s) 304. The UI 308 may include a keyboard and a mouse. The display 310 and the UI 308 may provide any of the GUIs in the embodiments of this disclosure.

The methods and systems described herein may be implemented as a stand-alone compiler or as a compiler add-on that integrates with existing compilers for languages that are amenable to dynamic inter-procedural analysis (provided such compilers provide sufficient extensibility).

Additionally, the methods and systems described herein may be implemented as a user-facing software package that provides users with the ability to generate the derivative of a particular user-defined function. In other words, a user of the system defines the math or the function to be used, and the compiler transform system generates a program that can be used to output the derivative of that user-defined function, as described herein. Thus, if the user defines a function $f(x)$ and wants to add the second derivative of $f(x)$ to train a machine-learning model that incorporates the function $f(x)$, the compiler transform system automatically creates an output function capable of performing this computation. The output program is another function; it itself is not the derivative of $f()$, but rather the output is a new function that, if called correctly, will give the derivative of $f()$ as its output.

As can be seen, the methods and systems described herein enable a significant speed-up in the implementation of the derivative.

Applications of the Methods and Systems for Compiler Transforms Described Herein Physics-informed neural networks ("PINNs"): PINNs embed machine-learning models into the context of a traditional scientific problem. Such problems are often specified as systems of differential equations. For example, PINNs may be used to take a second-order partial differential equation and replace one or more variables with neural networks.

As a result, PINNs require computing derivatives of functions that themselves involve the computation of derivatives. For example, a second-order differential-equation system may be combined with a stochastic gradient descent based machine learning system (which requires one order of derivatives) and then regularized using a gradient penalty (which requires another order of derivatives). Such a problem would thus require the computation of fourth-order derivatives, which may be prohibitively expensive in traditional systems. The methods and systems described herein may be used to compute the fourth-order derivatives necessary.

Physics-informed generative adversarial networks ("PI-GANs"): PI-GAN are a generalization of PINNs that can learn probability distributions from data, and therefore can be employed for modeling the stochasticity in physical systems. The methods and systems described herein may be implemented in the context of PI-GANs to solve real-world problems where real-world data is unknown, such as in situations where there are multiple sensors providing real-time data to a model for analysis. When the performance of the model depends on the accuracy of the sensor data, but the sensor data is unknown, such methods and systems and described herein may be employed to determine a solution to the real-world model.

As one example, such methods and systems may be used to model a problem involving nuclear waste remediation. In such an example, mathematical models of subsurface flow and transport are inherently uncertain because of the lack of data about the distribution of geological units, the distribution of hydrological properties (e.g., the hydraulic conductivity) within each unit, and initial and boundary conditions. In an example such as this, uncertain initial and boundary conditions and model parameters render the governing model equations stochastic. In this context, uncertainty quantification becomes equivalent to solving stochastic partial differential equations ("SPDEs"). Forward solution of SPDEs requires that all model parameters as well as the initial/boundary conditions are prescribed either deterministically or stochastically, which is not possible unless experimental data is available to provide additional information for critical parameters.

The model for nuclear waste remediation once again requires computation of multiple different orders of derivatives for both the generator and discriminator components of the PI-GAN. The methods and systems described herein allow the efficient generation of these derivatives, while at the same time enabling traditional compiler transforms to apply to the problem, thus further increasing performance.

Modeling and Simulation: Modeling and simulation of systems (mechanical, physical, biological, to name a few) is often carried out by implementing the underlying science in a programming language. Often, the underlying science requires taking gradients or derivatives of a function in the code. This may be done by calculating the derivative analytically and programming it manually, or by using an AD system. For users of dynamic programming languages, the ability to compute derivatives of programs automatically leads to significant gains in productivity.

Modeling and simulation systems are combined with optimization algorithms, such that the overall model designed by a scientist or engineer is optimized with respect to some input or output variables. In such a situation, the ability to compute derivatives automatically through AD within an optimization algorithm makes it possible to optimize models without user intervention.

Surrogates of models can be used in place of actual physical/mechanistic models in order to speed up a simulation through training over data. These surrogates can be neural networks, echo state networks, continuous time echo state networks, and similar structures in machine learning algorithms. The process of training a surrogate requires using AD to compute derivatives within a program. Such surrogates are useful in significantly speeding up simulation. While surrogates can be constructed for simulations in a general way, examples include physical systems, such as heating, ventilation, and cooling ("HVAC") systems, electronic circuits and semiconductors, and biological/pharmaceutical simulations.

A person having ordinary skill in the art will recognize that the principles described herein may be applied to other physical systems not explicitly described herein, as the model described herein here provides a framework that is not specific to any particular physical system but rather can be used to localize the non-local functions of any physical system.

The descriptions of the various embodiments of the technology disclosed herein have been presented for purposes of illustration, but these descriptions are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for performing a compiler transform on code that represents a computer program written in an existing programming language, the method comprising:
    receiving, by a graphical user interface, the code from a user that represents the computer program written in the existing programming language, wherein the code includes a plurality of original instructions;
    optimizing, by a compiler, the compiler transform on the code that represents the computer program by performing a dynamic inter-procedural analysis of the computer program to determine a maximum set of computer program information that can be determined from the computer program during execution of the computer program;
    applying, by the compiler, a non-local to local transformation on the determined maximum set of computer program information to generate a transformed local function;
    mapping, by the compiler, each of one or more original instructions of the plurality of original instructions to an optic having a composition property that allows the optic to be combined with another optic;
    implementing, by the compiler, a representation of the optic as an opaque closure in the transformed local function; and
    generating, by the compiler, a transformed computer program that represents the transformed local function, wherein the transformed computer program is executed to generate a derivative of the computer program.

2. The method of claim 1, wherein the mapping includes treating a primal function as the optic.

3. The method of claim 1, wherein the code that represents the computer program defines a mathematical model of a function.

4. The method of claim 1, wherein the dynamic inter-procedural analysis of the computer program is performed through lattice-based data-flow analysis.

5. The method of claim 1, wherein the computer program is evaluated on an abstract symbolic domain.

6. The method of claim 1, wherein the method is applied to a physics-informed neural network or a physics-informed generative adversarial network.

7. The method of claim 1, wherein the non-local to local transformation includes interleaving a transformation step and an optimization step.

8. The method of claim 7, wherein the non-local to local transformation is delayed until at least one optimization step has been performed, and wherein, after the at least one optimization step has been performed, the transformed computer program is generated for an $n^{th}$-order transformation.

9. The method of claim 1, wherein the non-local to local transformation includes creating a data structure for an $n^{th}$-order residual such that the non-local to local transformation can be optimized.

10. A system for performing a compiler transform on code that represents a computer program written in an existing programming language, the system comprising:
    a computer having a processor that executes a compiler and a graphical user interface, wherein the graphical user interface is adapted to receive the code from a user that represents the computer program written in the existing programming language, wherein the code includes a plurality of original instructions, and wherein the processor is adapted to cause the compiler to:
    optimize the compiler transform on the code that represents the computer program by performing a dynamic inter-procedural analysis of the computer program to determine a maximum set of computer program information that can be determined from the computer program during execution of the computer program;
    apply a non-local to local transformation on the determined maximum set of computer program information to generate a transformed local function;
    map each of one or more original instructions of the plurality of original instructions to an optic having a composition property that allows the optic to be combined with another optic;
    implement a representation of the optic as an opaque closure in the transformed local function; and
    generate a transformed computer program that represents the transformed local function, wherein the transformed computer program is executed to generate a derivative of the computer program.

11. The system of claim 10, wherein the mapping includes treating a primal function as the optic.

12. The system of claim 10, wherein the code that represents the computer program defines a mathematical model of a function.

13. The system of claim 10, wherein the dynamic inter-procedural analysis of the computer program is performed through lattice-based data-flow analysis.

14. The system of claim 10, wherein the computer program is evaluated on an abstract symbolic domain.

15. The system of claim 10, wherein the method is applied to a physics-informed neural network or a physics-informed generative adversarial network.

16. The system of claim 10, wherein the non-local to local transformation includes interleaving a transformation step and an optimization step.

17. The system of claim 16, wherein the non-local to local transformation is delayed until at least one optimization step has been performed, and wherein, after the at least one optimization step has been performed, the transformed computer program is generated for an $n^{th}$-order transformation.

18. The system of claim 10, wherein the non-local to local transformation includes creating a data structure for an $n^{th}$-order residual such that the non-local to local transformation can be optimized.

* * * * *